US006701282B2

(12) United States Patent
Ting et al.

(10) Patent No.: US 6,701,282 B2
(45) Date of Patent: Mar. 2, 2004

(54) FAULT IDENTIFICATION DIAGNOSTIC FOR INTAKE SYSTEM SENSORS

(75) Inventors: Thomas L. Ting, Troy, MI (US); John F. Van Gilder, Webberville, MI (US)

(73) Assignee: General Motors Corporation, Detroit, MI (US)

( * ) Notice: Subject to any disclaimer, the term of this patent is extended or adjusted under 35 U.S.C. 154(b) by 195 days.

(21) Appl. No.: 09/961,537

(22) Filed: Sep. 20, 2001

(65) Prior Publication Data

US 2003/0065483 A1 Apr. 3, 2003

(51) Int. Cl.[7] ................................................. G06F 5/00
(52) U.S. Cl. ..................... 702/185; 702/47; 702/138; 702/183
(58) Field of Search ................... 702/45, 47, 138, 702/183, 185; 701/36; 123/525; 73/117.3

(56) References Cited

U.S. PATENT DOCUMENTS

| 5,041,976 A | * | 8/1991 | Marko et al. | .......... 364/424.03 |
| 5,431,011 A | | 7/1995 | Casarella et al. | ............. 60/274 |
| 5,509,302 A | * | 4/1996 | Drexel et al. | .............. 73/117.3 |
| 6,145,494 A | * | 11/2000 | Klopp | ......................... 123/525 |
| 6,370,935 B1 | * | 4/2002 | He et al. | ..................... 73/1.34 |
| 6,484,080 B2 | * | 11/2002 | Breed | .......................... 701/36 |
| 6,497,227 B2 | * | 12/2002 | Wang et al. | ............ 123/568.16 |

OTHER PUBLICATIONS

SAE paper #970209; M. Nyberg/L. Nielsen, "Model Based Diagnosis for the Air Intake System of the SI–Engine"; Feb. 1997, p. 1–12.

* cited by examiner

*Primary Examiner*—Marc S. Hoff
*Assistant Examiner*—Felix Juarez
(74) *Attorney, Agent, or Firm*—Anthony Luke Simon

(57) ABSTRACT

A fault identification system for intake system sensors according to the invention includes a throttle position sensor (TPS), a manifold absolute pressure (MAP) sensor, and a mass airflow (MAF) sensor. A diagnostic controller is coupled to the TPS, the MAP sensor and the MAF sensor. The diagnostic controller implements a throttle model, a first intake model and a second intake model and correctly identifies faults in the TPS, the MAP sensor and the MAF sensor. The throttle model generates a mass airflow estimate. The first intake model generates a first MAP estimate. The second intake model generates a second MAP estimate. The diagnostic controller applies residual calculations on outputs of the throttle model, the first intake model and the second intake model. The diagnostic controller applies a first order lag filter on the residual calculations. The diagnostic controller accesses a truth table to identify faults in the TPS, the MAP sensor and the MAF sensor.

18 Claims, 7 Drawing Sheets

FIG.5

| Pr | Ψ |
|---|---|
| 0.000 | 0.685 |
| 0.520 | 0.685 |
| 0.560 | 0.683 |
| 0.600 | 0.677 |
| 0.650 | 0.662 |
| 0.700 | 0.638 |
| 0.750 | 0.605 |
| 0.800 | 0.561 |
| 0.820 | 0.539 |
| 0.860 | 0.488 |
| 0.880 | 0.457 |
| 0.900 | 0.423 |
| 0.920 | 0.382 |
| 0.960 | 0.277 |
| 0.980 | 0.198 |
| 0.990 | 0.141 |

FIG. 6

| IAT (C) | fn(IAT) |
|---|---|
| -20 | 269.5 |
| -10 | 274.8 |
| 0 | 280 |
| 10 | 285 |
| 20 | 290 |
| 30 | 295 |
| 40 | 300 |
| 50 | 304.5 |
| 60 | 309.2 |
| 70 | 313.8 |
| 80 | 318.4 |
| 90 | 322.8 |
| 100 | 327.2 |

FIG. 9

| (LAGMAFR$_t$) | (LAGMAP1R$_t$) | (LAGMAP2R$_t$) | (LAGTPSR$_t$) | |
|---|---|---|---|---|
| MAF_Fail | MAP1_Fail | MAP2_Fail | TPS_Fail | Set DTC |
| False | False | False | False | None |
| True | False | False | False | None |
| False | True | False | False | None |
| True | True | False | False | None |
| False | False | True | False | None |
| True | False | True | False | MAF/P0101 |
| False | True | True | False | MAP/P0106 |
| True | True | True | False | P0101&P0106 |
| False | False | False | True | TPS/P0121 |
| True | False | False | True | TPS/P0121 |
| False | True | False | True | TPS/P0121 |
| True | True | False | True | TPS/P0121 |
| False | False | True | True | None |
| True | False | True | True | Generic/P1101 |
| False | True | True | True | Generic/P1101 |
| True | True | True | True | Generic/P1101 |

FAULT IDENTIFICATION DIAGNOSTIC FOR INTAKE SYSTEM SENSORS

FIELD OF THE INVENTION

The present invention relates to diagnostic systems for internal combustion engines, and more particularly to diagnostic systems for identifying a fault in a throttle position sensor, a manifold absolute pressure sensor, and/or a mass airflow sensor of an onboard diagnostic system for an internal combustion engine.

BACKGROUND OF THE INVENTION

Vehicles with internal combustion engines generally employ intake system sensors including a throttle position sensor (TPS), a mass airflow (MAF) sensor, and a manifold absolute pressure (MAP) sensor. When one of these sensors is not operating properly, it is relatively difficult for a technician to readily identify which sensor is faulty. Part of the problem stems from the inability to identify the faulty sensor based upon available information such as fault codes, operating characteristics or other available diagnostic information. As a result, the diagnosis and repair times involving the failure of one of these sensors are relatively high, which increases the warranty cost of the vehicle.

SUMMARY OF THE INVENTION

A fault identification system for intake system sensors according to the invention includes a throttle position sensor (TPS), a manifold absolute pressure (MAP) sensor, and a mass airflow (MAF) sensor. A diagnostic controller is coupled to the TPS, the MAP sensor and the MAF sensor. The diagnostic controller implements a throttle model, a first intake model and a second intake model to identify faults in the TPS, the MAP sensor and the MAF sensor.

In other features of the invention, the throttle model generates a mass airflow estimate. The first intake model generates a first manifold absolute pressure estimate. The second intake model generates a second manifold absolute pressure estimate.

In still other features, the diagnostic controller performs residual calculations on outputs of the throttle model, the first intake model and the second intake model. The diagnostic controller performs a first order lag filter on the residual calculations and applies a truth table to identify faults in the TPS, MAP and MAF sensors.

In another aspect of the invention, a fault identification method for intake system sensors generates a mass airflow estimate using a throttle model. A first manifold absolute pressure (MAP) estimate is generated using a first intake model. A second MAP estimate is generated using a second intake model. Faults are identified in a throttle position sensor (TPS), a mass airflow (MAF) sensor and a MAP sensor using the mass airflow estimate, the first MAP estimate and the second MAP estimate.

In other features, residual calculations and a lag filter are performed on the mass airflow estimate, the first MAP estimate and the second MAP estimate. The first order lag filter calculations are used to access a truth table to identify faults in the TPS, the MAP sensor and the MAF sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a first lookup table ($\phi$) that is based on barometric pressure;

FIG. 6 is a second lookup table that is based on intake air temperature; and

FIG. 9 is a truth table used by the residual calculation and processing module.

DETAILED DESCRIPTION OF THE PREFERRED EMBODIMENTS

The following description of the preferred embodiment(s) is merely exemplary in nature and is in no way intended to limit the invention, its application, or uses.

The Intake Rationality Diagnostic provides a "within range" rationality check for mass air flow (MAF), manifold absolute power (MAP), and throttle position sensor (TPS) sensors. The rationality check is an explicit model based diagnostic containing three separate models for the intake system. The model accounts for variable volumetric efficiency engines due to new features such as variable cam phasing and cylinder deactivation. The model structure makes use of analytic redundancy to improve diagnostic robustness against false MILs and also to improve on board fault isolation when compared with the prior MAF-MAP and MAP-TPS rationality checks.

A throttle model describes the flow through the throttle body and is used to estimate the mass air flow through the throttle body as a function of ambient air pressure, estimated MAP, throttle position, and IAT. The throttle model is quasi-steady state and uses a first order lag filter to model dynamic air flow effects through the throttle body. The throttle model uses the effective flow area of the throttle body as a function of the TPS.

A first intake manifold model describes the intake manifold and is used to estimate MAP as a function of the mass flows into the manifold (from the throttle body and exhaust gas recirculation (EGR)) and the mass flows from the manifold caused by engine pumping. The intake manifold model is also quasi-steady state and accounts for manifold dynamics by integrating the effect of small step flow changes with time. The flow into the manifold from the throttle uses the estimate calculated from the throttle model. The engine flow model utilizes a model to determine volumetric efficiency and relies on the intake manifold model to properly account for the effect of altitude, cam phasing, and cylinder deactivation on volumetric efficiency. The intake manifold model also relies on a charge temperature model to account for the effect of EGR flow on the temperature of the gas in the intake manifold.

A second intake manifold model is identical to the first intake manifold model that is described above except that the MAF sensor is used instead of the throttle model for the throttle air input.

The estimates of MAF and MAP obtained from the models are then compared to the actual measured values. The comparison generates three residuals, one residual in MAF from the throttle model and two residuals in MAP from the first and second intake manifold models. The residuals are then filtered through an exponentially weighted moving average (EWMA) and the EWMA values are compared to thresholds and each other to determine the appropriate faulted sensor.

Figure 1:
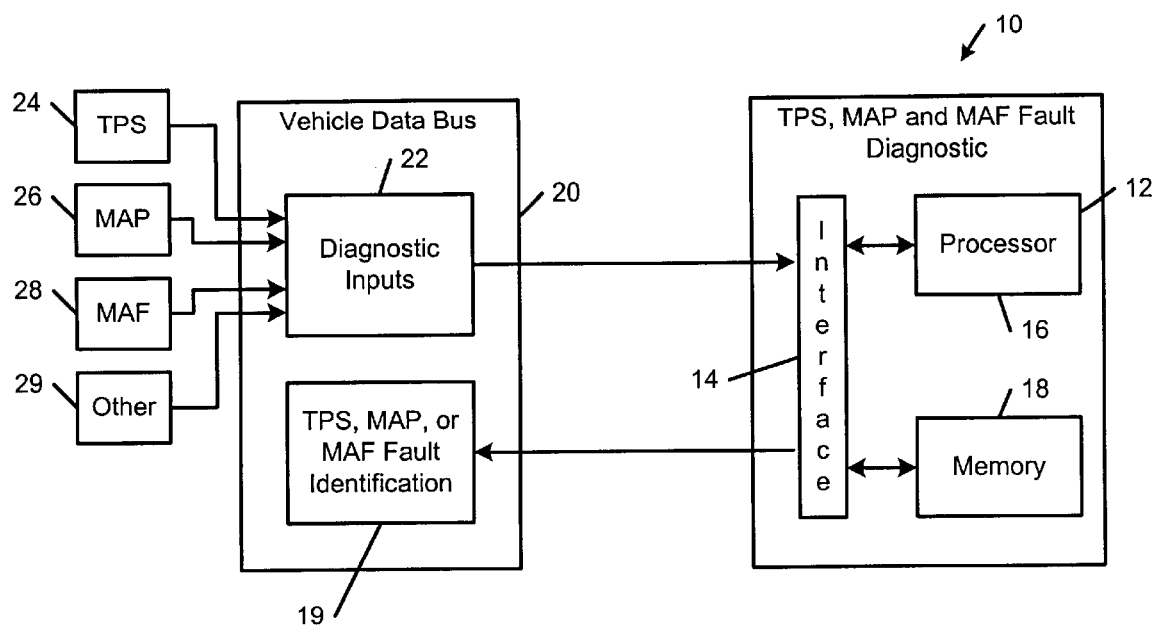
FIG. 1 is a functional block diagram of a fault diagnostic system according to the present invention for intake system sensors.

Referring now to FIG. 1, a fault identification diagnostic system 10 according to the present invention for intake system sensors is illustrated. The diagnostic system 10 preferably includes a controller 12 with an input/output interface 14, a processor 16, and memory 18. The interface 14 is preferably connected to a vehicle data bus 20. Diagnostic inputs 22 from a throttle position sensor (TPS) 24, a manifold absolute pressure (MAP) sensor 26, a mass airflow (MAF) sensor 28, and other inputs 29 are received from the vehicle data bus 20. Alternately, the diagnostic system can be directly connected to the individual diagnostic inputs 22. When there is a fault in the TPS 24, the MAP sensor 26, and/or the MAF sensor 28, the controller 12 generates a fault identification signal (shown at 19) that identifies the faulty sensor(s) with a very high degree of certainty.

Figure 2:
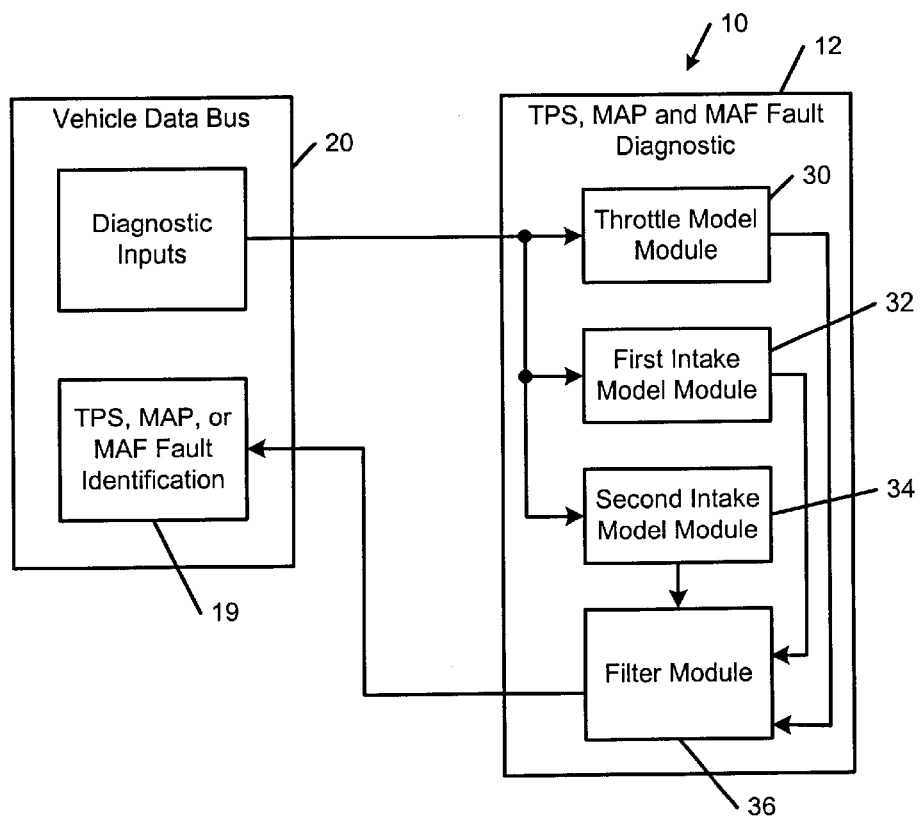
FIG. 2 is a functional block diagram of the fault diagnostic system of FIG. 1 in further detail.

Referring now to FIG. 2, for purposes of clarity reference numerals from FIG. 1 have been used where appropriate to identify similar elements. As can be appreciated, the controller 12 includes a throttle module 30 that implements a throttle model, a first intake module 32 that implements a first intake model, a second intake module 34 that implements a second intake model, and a residual calculation and processing module 36. The modules 30, 32, 34 and 36 are preferably software programs that are implemented by the processor 16 and memory 18.

The throttle module 30 generates a mass airflow estimate using the throttle model. The first intake module 32 generates a first manifold absolute pressure estimate using the first intake model. The second intake module 34 generates a second manifold absolute pressure estimate using a second model. Based on the outputs of the modules 30, 32 and 34, the residual calculation and processing module 36 performs additional calculations and processing. The residual calculation and processing module 36 identifies the faulty TPS, the MAP sensor and/or the MAF sensor.

Figure 3:
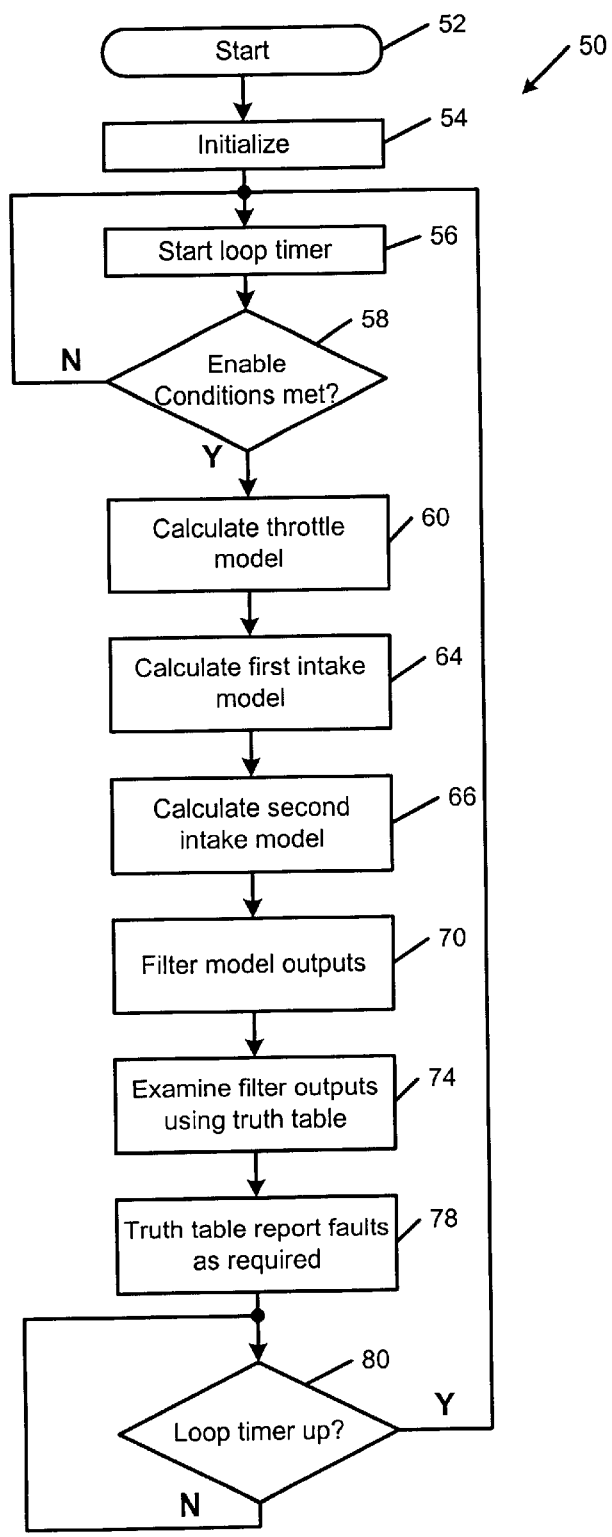
FIG. 3 illustrates steps for operating the fault diagnostic system.

Referring now to FIG. 3, steps performed by the fault diagnostic system 10 are shown and are generally designated 50. Control begins with step 52. In step 54, input variables are initialized. In a preferred mode, raw sensor input data is used to initialize the models that are executed by the modules 30, 32 and 34 and the filters in the residual calculation and processing module 36. This allows the filters to stabilize quickly. Subsequent calculation cycles of the models and filters use prior model estimates from a previous diagnostic cycle as will be described further below.

In step 56, a loop timer is started. The loop timer is preferably set to approximately 100 ms. In addition to the loop timer, a stabilization timer may also be used. The stabilization timer disables reporting from a fault truth table until a terminal delay time such as 50 seconds is reached. The stabilization timer is enabled until any of the enabling conditions become false. In step 58, enabling conditions are checked. If the enabling conditions have not been met, control loops back to step 56. Enabling conditions include engine speed such as rpm between 1500 and 2300, intake air temperature (IAT) between maximum and minimum values, coolant temperature between maximum and minimum values, no sensor faults (such as open or short-circuits). Preferably, if $EGR_{pos}$ fault is active, then $EGR_{pos}$ is set equal to zero for this diagnostic. EGRpos is the indication position of the EGR valve and is a value that is related to the expected flow rate of exhaust gas through the valve.

Otherwise, control continues with step 60 where the throttle module 30 generates the mass airflow estimate. In step 64, the first intake module 32 generates the first manifold absolute pressure estimate. In step 66, the second intake module 34 generates the second manifold absolute pressure estimate. In step 70, the residual calculation and processing module 36 performs additional calculations and processing and filters the model outputs. In step 74, the residual calculation and processing module 36 examines the filter outputs using a truth table. In step 78, the residual calculation and processing module 36 reports faults that are identified by the truth table. In step 80, the loop timer is checked. If the loop timer is up, control returns to step 56 and the fault diagnostic system performs an additional check. Otherwise, control loops back to step 80.

Figure 4:
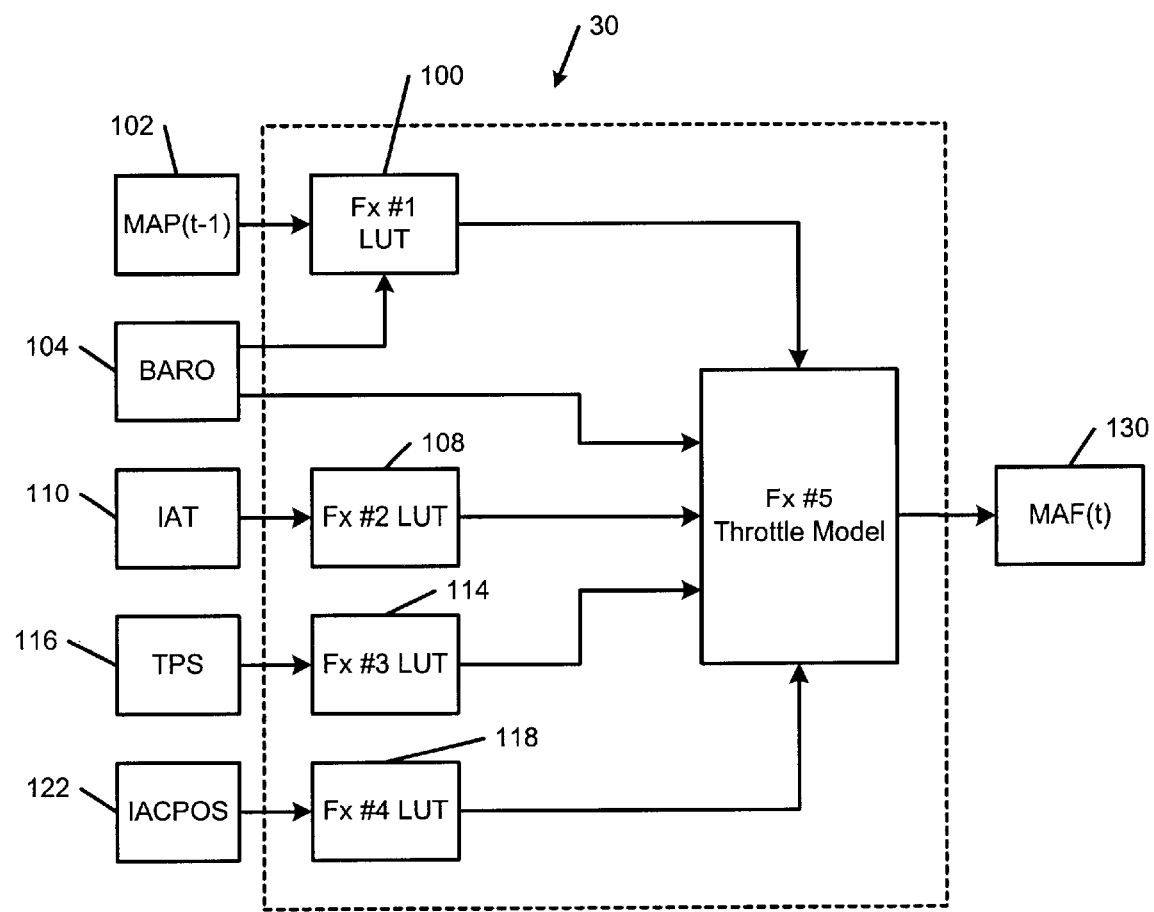
FIG. 4 illustrates a throttle model of the fault diagnostic system.

Referring now to FIG. 4, operation of the throttle module 30 is shown in further detail. The throttle module 30 includes a first function generator 100 that can be calculated in real time or implemented as a lookup table. The first function generator 100 receives $MAP1_{t-1}$ (shown at 102), which is the first manifold absolute pressure estimate that is output by the first air intake module 32 from a prior time period. This value is initialized with raw data from the MAP sensor (not shown) of the vehicle. The first function generator 100 also receives a barometer (BARO) measurement (shown at 104). The input 102 is initialized by the MAP sensor at time t. The first function is defined as follows:

BARO=Barometric Pressure in kPa $\Psi = fn(M\hat{AP}_{t-1}, BARO_t)$ (Note: $Pr = M\hat{AP}1_{t-1}/BARO_t$ and $0.99 \geq Pr$)

FIG. 5 is a 2-D look up table that defines $\Psi$ as a function of Pr.

The throttle module 30 further includes a second function generator 108 that can be calculated in real time or implemented as a lookup table.

The second function generator 108 receives the intake air pressure (IAT) (shown at 110) as an input. The second function is defined as follows:

$fn(IAT) = \sqrt{R*(IAT + 273.15)}$

R=Ideal gas constant for air=287 $m^2/(s^2*K)$
FIG. 6 is a 2-D lookup table that defines fn(IAT) as a function of IAT in ° C.

The throttle model module 30 further includes a third function generator 114 that can be calculated in real time or implemented as a lookup table. The third function generator 114 receives a throttle position signal (TPS) from a throttle position sensor 116. The third function is defined as follows:

fn(TPS)=Calibration lookup table (20×2)

Input Range=0%–100%

Input Resolution=5%

Output: Effective flow area ($mm^2$)

The throttle module 30 further includes a fourth function generator 118 that can be calculated in real time or implemented as a lookup table. The fourth function generator 118 receives the IACPOS signal (shown at 122) as an input. The fourth function is defined as follows:

$fn(IACPOS)$=Calibration lookup table (26×2)

Input: IACPOS in counts

Range=0–255

Resolution=10

Output: Effective Flow Area (mm²)

The BARO signal 104 and the output of the first, second, third and fourth function generators 100, 108, 114, and 118 are input to a fifth function generator 126 that calculates the mass airflow estimate 130. The fifth function is defined as follows:

$$M\hat{AF}_t = \frac{maflag * BARO_t * \Psi * [fn(TPS_t) + fn(IACPOS_t)]}{fn(IAT_t)} + (1 - maflag) * M\hat{AF}_{t-1}$$

maflag=first order lag filter

Range: 0–1

Resolution: 0.01

Figure 7:
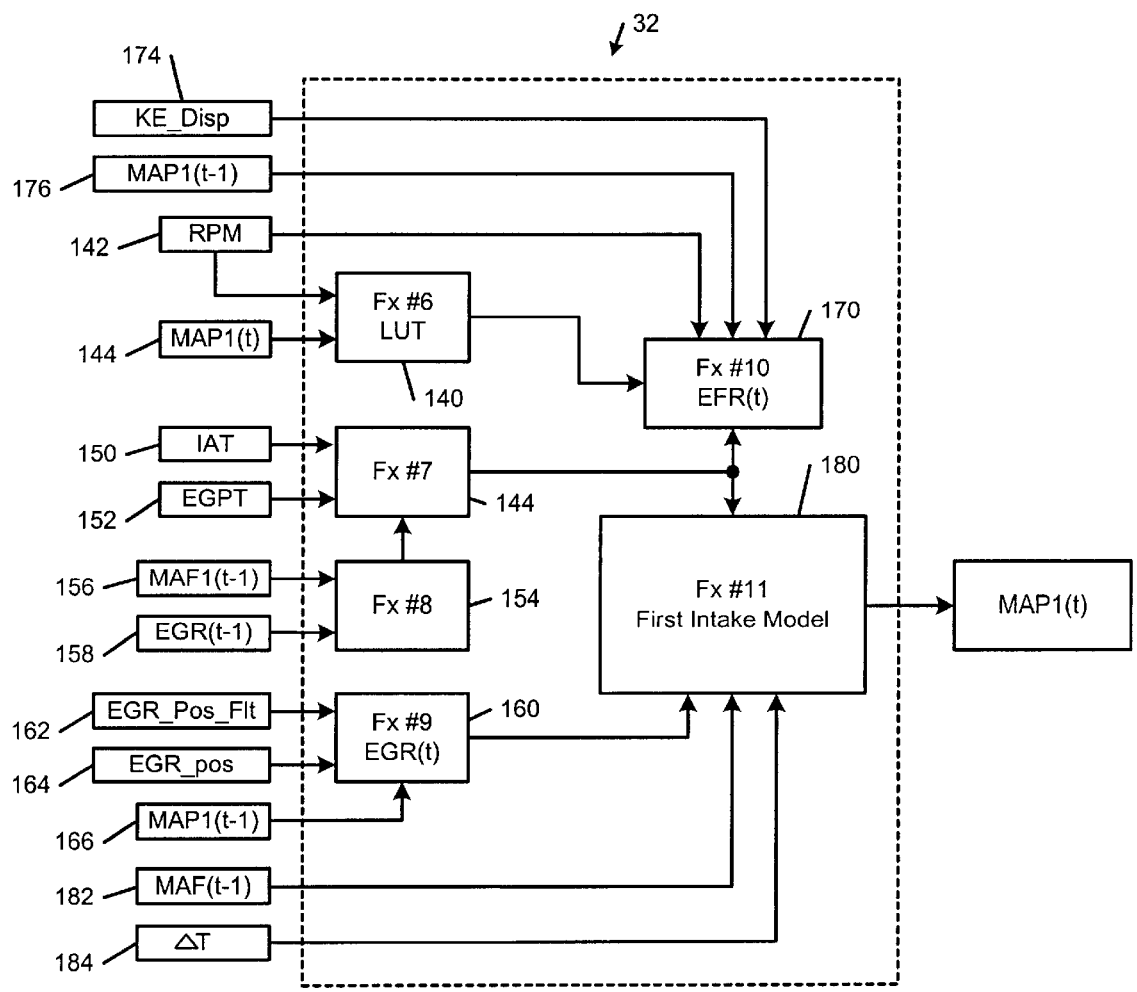
FIG. 7 illustrates a first intake model of the fault diagnostic system.

Referring now to FIG. 7, the first intake model 32 is shown in further detail. The first intake module 32 includes a sixth function generator 140 that can be calculated in real time or implemented as a lookup table. The sixth function generator 140 receives a RPM signal 142 and $MAP1_{t-1}$ (shown at 144), which is the first manifold absolute pressure estimate from the first intake module 32 for the prior time period. This value is initialized with raw data from the MAP sensor (not shown).

The first intake module 32 includes a seventh function generator 144 that receives IAT and an exhaust gas predictive temperature (EGPT) inputs 150 and 152. The seventh function is defined as follows:

$$T_m = (IAT + 273.15) + fr*(T_{ex} - IAT)$$

$T_m$, in ° K (degrees Kelven)

$T_{ex}$=Exhaust Temperature from the Exhaust Gas

Predictive Temperature Diagnostic Function (EGPT_Exhaust_Temp[Sensor 1-1 or 2-1]) (Units: ° C.)

$$fr = EG\hat{R}_{t-1}/(M\hat{AF}_{t-1} + EG\hat{R}_{t-1})$$

The first intake module 32 includes an eighth function generator 154 that receives $MAF_{t-1}$ and the exhaust gas recirculation measurement at time (t–1) $(EGR_{t-1})$ as inputs as shown at 156 and 158. The eighth function is defined as follows:

$$fr = EG\hat{R}_{t-1}/(M\hat{AF}_{t-1} + EG\hat{R}_{t-1})$$

The first intake module 32 includes a ninth function generator 160 that receives EGR_POS_Fault, EGP_pos, and $MAF_{t-1}$ as inputs as shown at 162, 164 and 166. The ninth function is defined as follows:

$$EG\hat{R}_t = kegrlag*fn(EG\hat{R}_{pos}, M\hat{AP}1_{t-1}, BARO) + (1-kegrlag)*EG\hat{R}_{t-1}$$

3D lookup with:
  Variable $EGR_{pos}$
  Range 0%–100%
  Resolution 10%

MAP1/(BARO+calbkpres)
  Range 0–1
  Resolution 0.05 calbkpres=back pressure estimate
  Range: 0–10 kPa
  Resolution: 0.1 kPa kegrlag=EGR flow first Order lag filter
  Range: 0–1
  Resolution: 0.01

The first intake model includes a tenth function generator 170 that receives KE_Disp (shown at 174), the MAP1 (t–1) (shown at 176), RPM 142 and the output of the sixth function generator 140 as inputs. The $10^{th}$ function is defined as follows:

$$EF\hat{R}_t = RPM*MAP1_{t-1}*VE*Bcor*Disp/120*R*T_m$$

VE=Volumetric efficiency $[fn(RPM, MAP1_{t-1})]$

Bcorr=Barometric correction for VE [fn(Baro,RPM)]

Disp=Engine Displacement (Units: cm³)

fraction=fraction of BARO allowed for maxium MAP1

Outputs of the seventh, ninth and $10^{th}$ function generators 144, 160 and 170 are input to an $11^{th}$ function generator 180. In addition, $MAF1_{t-1}$ (shown at 182) and ΔT in milliseconds (shown at 184) are input to the $11^{th}$ function generator. The output of the $11^{th}$ function generator 180 is the $MAP1_t$. The $11^{th}$ function is defined as follows:

$$M\hat{AP}1_t = M\hat{AP}1_{t-1} + \left[\frac{\Delta t * T_m * R * (M\hat{AF}_{t-1} + EG\hat{R}_t - EF\hat{R}_t)}{Vol_{intake}}\right]$$

or $M\hat{AP}1_t$=fraction*BARO whichever is less

Where:
  $M\hat{AP}1_{t=0} = MAP_{t=0}$ estimate set to actual inputs (raw data)
  Δt=loop execution time (0.1 sec≧t)
  R=gas constant for Air=287 m²/(s²*° K)
  $Vol_{intake}$=Intake Manifold Volume (Calibration)
  $Vol_{intake}$=in cm³
  $M\hat{AF}1_{t-1}$=From Throttle Equation (Units: g/s)

Figure 8:
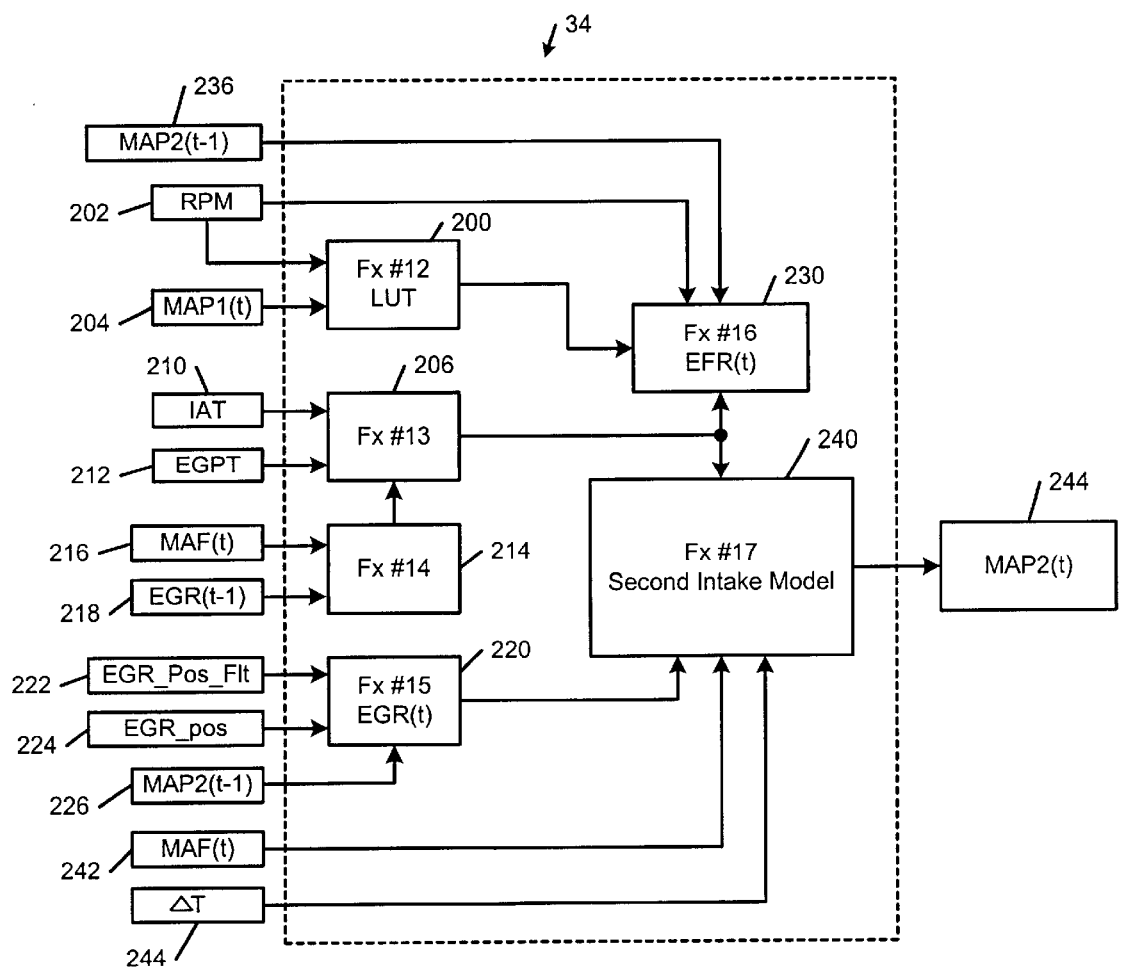
FIG. 8 illustrates a second intake model of the fault diagnostic system.

Referring now to FIG. 8, the second intake module 34 is shown in further detail. The second intake module 34 includes a $12^{th}$ function generator 200 that can be calculated in real time or implemented as a lookup table. The $12^{th}$ function generator 200 receives a RPM signal 202 and the first manifold absolute pressure estimate at time t (shown at 204) $(MAP_t)$.

The second intake model module 34 includes a $13^{th}$ function generator 206 that receives IAT and EGPT inputs 210 and 212. The second intake model module 34 includes a $14^{th}$ function generator 214 that receives the $MAF1_t$ and $EGR_{t-1}$ as inputs as shown at 216 and 218. The second intake model module 34 includes a $15^{th}$ function generator 220 that receives EGR_POS_Fault, EGP_pos, and the $MAP2_{t-1}$ as inputs as shown at 222, 224 and 226. The second intake model 34 includes a $16^{th}$ function generator 230 that receives $MAP2_{t-1}$ (shown at 236), RPM 202 and the output of the $12^{th}$ function generator 200 as inputs.

Outputs of the $13^{th}$, $15^{th}$ and 16th function generators 206, 220 and 230 are input to an $17^{th}$ function generator 240. In addition, $MAF_t$ (shown at 242) and ΔT in milliseconds (shown at 244) are input to the $17^{th}$ function generator 240. The output of the $17^{th}$ function generator 240 is equal to $MAP2_t$ as shown at 244. As can be appreciated, the $12^{th}$–$17^{th}$ functions are the same as the 6–$11^{th}$ functions except that MAP2(t) replaces MAP1(t), MAF(t) replaces MAF(t-1), and MAp2(t-1) replaces MAP1(t-1).

The residual calculation and processing module 36 performs the following calculations:

$$MAFR_t = MAF - MAF_t$$

$$MAP1R_t = MAP - M\hat{A}P1_t$$

$$MAP2R_t = MAP - M\hat{A}P2_t$$

$$TPSR_t = MAFR_t * MAP1R_t$$

Then, the residual calculation and processing module 36 performs a first order lag filter as follows:

$$LAGMAFR_t = (1-\lambda_A)*LAGMAFR_{t-1} + \lambda_A*MAFR_t$$

$$LAGMAP1R_t = (1-\lambda_B)*LAGMAP1R_{t-1} + \lambda_B*MAP1R_t$$

$$LAGMAP2R_t = (1-\lambda_C)*LAGMAP2R_{t-1} + \lambda_C*MAP2R_t$$

$$LAGTPSR_t = (1-\lambda_D)*LAGTPSR_{t-1} + \lambda_D*TPSR_t$$

If enable conditions are not met, then $t_{stable}$ is set equal to 0, else increment $t_{stable}$

---

If $t \geq t_{stable}$, then:
    If |LAGMAFR$_t$| > MAF_Fail_cal,
        Then MAF_Fail = True
    Else MAF_Fail = False
    If |LAGMAP1R$_t$| > MAP1_Fail_cal,
        Then MAP1_Fail = True
    Else MAP1_Fail = False
    If |LAGMAP2R$_t$| > MAP2_Fail_Cal,
        Then MAP2_Fail = True
    Else MAP2_Fail = False
    If LAGTPSR$_t$ >TPS_Fail_cal,
        Then TPS_Fail =True
    Else TPS_Fail = False
    ELSE Calculate next model iteration
Calculate next model iteration

---

Finally, the residual calculation and processing employs a truth table (see FIG. 9) to correctly identify faults in the MAP, MAF or TPS sensor. The faults are output to the vehicle data bus, the vehicle diagnostic system or stored for retrieval by science technicians.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fault identification system for intake system sensors, comprising:
   a throttle position sensor (TPS);
   a manifold absolute pressure (MAP) sensor;
   a mass airflow (MAF) sensor; and
   a diagnostic controller that is coupled to said TPS, said MAP sensor and said MAF sensor, that implements a throttle model, a first intake model and a second intake model, and that identifies a fault in one of said TPS, said MAP sensor and said MAF sensor.

2. The fault identification system of claim 1 wherein said throttle model generates a mass airflow estimate.

3. The fault identification system of claim 2 wherein said first intake model generates a first MAP estimate.

4. The fault identification system of claim 3 wherein said second intake model generates a second MAP estimate.

5. The fault identification system of claim 4 wherein said diagnostic controller performs residual calculations on outputs of said throttle model, said first intake model and said second intake model.

6. The fault identification system of claim 5 wherein said diagnostic controller performs a first order lag filter on said residual calculations.

7. The fault identification system of claim 6 wherein said diagnostic controller employs a truth table to identify faults in said TPS, said MAP sensor and said MAF sensor.

8. A fault identification method for intake system sensors, comprising the steps of:
   generating a mass airflow estimate using a throttle model;
   generating a first manifold absolute pressure (MAP) estimate using a first intake model;
   generating a second MAP estimate using a second intake model; and
   identifying faults in one of a throttle position sensor (TPS), a mass airflow (MAF) sensor and a manifold absolute pressure (MAP) sensor using said MAF estimate, said first MAP estimate and said second MAP estimate.

9. The fault identification method of claim 8 further comprising the step of performing residual calculations on said MAF estimate, said first MAP estimate and said second MAP estimate.

10. The fault identification method of claim 9 further comprising the step of performing a first order lag filter calculations on said residual calculations.

11. The fault identification method of claim 10 further comprising the step of employing a truth table on said first order lag filter calculations to identify faults in said TPS, said MAP sensor and said MAF sensor.

12. A fault identification system for intake system sensors, comprising:
   a throttle position sensor (TPS);
   a manifold absolute pressure (MAP) sensor;
   a mass airflow (MAF) sensor;
   a diagnostic controller that is coupled to said TPS, said MAP sensor, and said MAF sensor, that includes a throttle module, a first intake module, a second intake module and a filter module, and that identifies a fault in one of said TPS, said MAP sensor and said MAF sensor.

13. The fault identification system of claim 12 wherein said throttle module generates a mass airflow estimate.

14. The fault identification system of claim 13 wherein said first intake module generates a first mass airflow estimate.

15. The fault identification system of claim 14 wherein said second intake module generates a second mass airflow estimate.

16. The fault identification system of claim 15 wherein said filter module performs residual calculations on outputs of said throttle module, said first intake module and said second intake module.

17. The fault identification system of claim 16 wherein said filter module performs a first order lag filter on said residual calculations.

18. The fault identification system of claim 17 wherein said filter module employs a truth table to identify faults in said TPS, MAP and MAF sensors.

* * * * *